Aug. 7, 1945.  R. T. WHITNEY  2,381,239
BRAKE RELEASING APPARATUS
Filed July 31, 1943
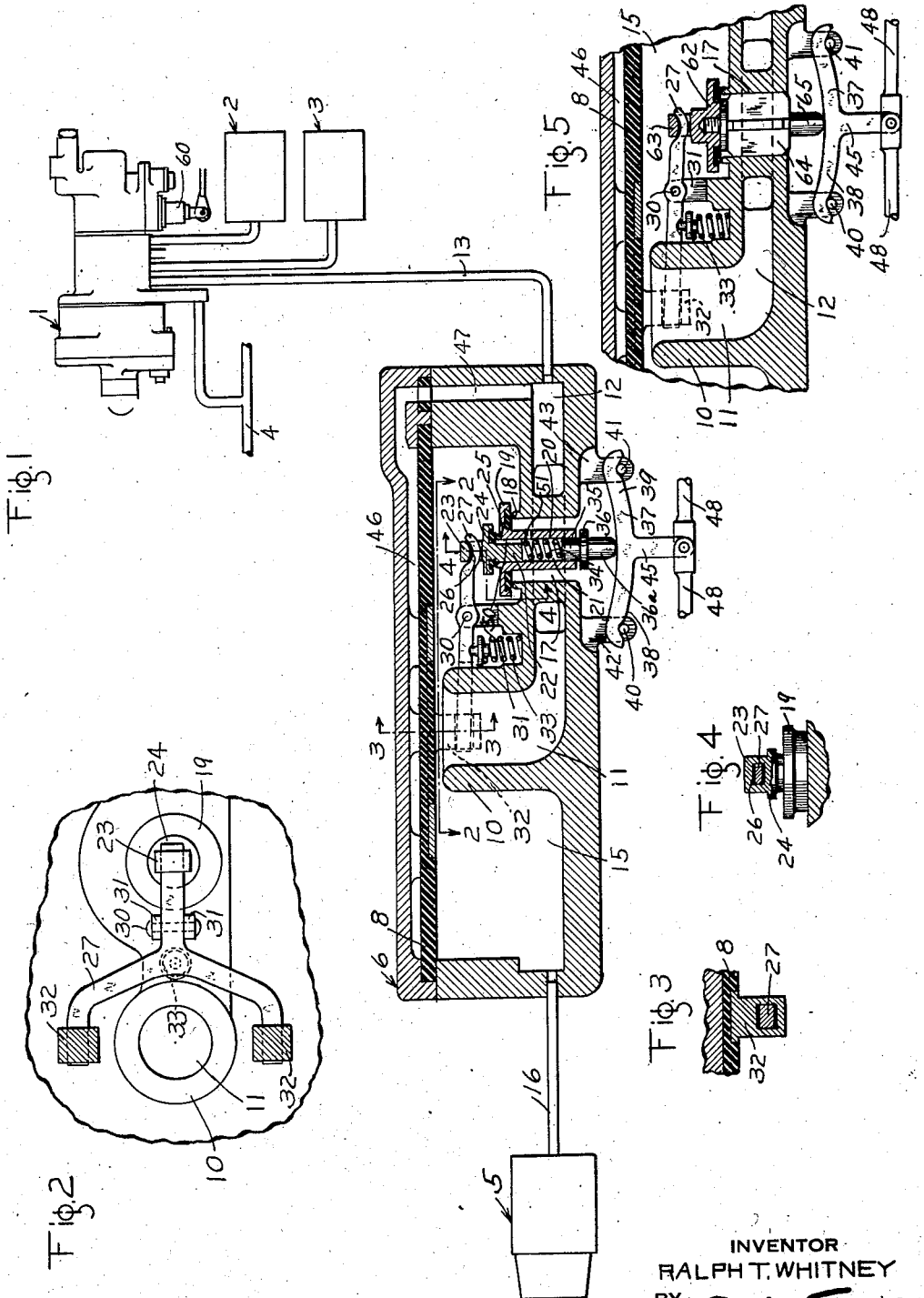
INVENTOR
RALPH T. WHITNEY
BY
ATTORNEY Patented Aug. 7, 1945

2,381,239

UNITED STATES PATENT OFFICE 2,381,239

BRAKE RELEASING APPARATUS

Ralph T. Whitney, Irwin, Pa., assignor to The Westinghouse Air Brake Company, Wilmerding, Pa., a corporation of Pennsylvania Application July 31, 1943, Serial No. 496,869

11 Claims. (Cl. 303—68)

This invention relates to fluid pressure brake apparatus of the automatic type and more particularly to means for causing operation of said apparatus to effect a release of the brakes.

When a car equipped with automatic brake apparatus and having the reservoir or reservoirs thereof charged with fluid under pressure is cut out of a train and the brake pipe on the car is vented, the brake controlling valve device will as a result of such venting move to emergency position. Movement of the brake controlling valve device to emergency position establishes communication between the reservoir or reservoirs and the brake cylinder device and permits the fluid in said reservoir or reservoirs to equalize into the brake cylinder device to effect an emergency application of the brakes on the car.

When releasing a brake application thus effected, the usual practice has been for a trainman to operate the reservoir release valve or valves to completely dissipate the fluid pressure from the reservoir or reservoirs and thereby from the connected brake cylinder device to release the brakes. This operation not only wastes the stored fluid pressure in the reservoir or reservoirs but also requires time on the part of the trainman since he must hold the reservoir release valve or valves open until the brakes are released. When the car is subsequently placed in a train, it is then necessary to completely recharge the reservoir or reservoirs either by a local yard charging plant or by a coupled locomotive before the train may be moved. This requires a relatively long period of time and consequently excessive use and wear of apparatus to accomplish same, all of which is undesirable.

The principal object of the invention is to provide novel release valve means for effecting a release of the brakes, when a car is cut out of a train, without dissipating the stored fluid pressure in the reservoir or reservoirs.

Other objects and advantages will be apparent from the following more detailed description of the invention.

In the accompanying drawing Fig. 1 is a diagrammatic view of an automatic fluid pressure brake of the "AB" type having associated therewith one form of combined cut off and release valve device embodying the invention; Figs. 2, 3 and 4 are views taken on the sectional lines 2—2, 3—3, and 4—4, respectively, of the combined cut off and release valve device shown in Fig. 1; Fig. 5 is a fragmentary view of a combined cut off and release valve device embodying another form of the invention.

*Description—Fig. 1*

As shown in Fig. 1 of the drawing the brake equipment comprises a brake controlling valve device 1, an auxiliary reservoir 2, an emergency reservoir 3, a brake pipe 4, a brake cylinder 5, and a combined cut off and brake cylinder release valve device 6.

The brake controlling valve device 1 shown is of the "AB" type. This controlling valve device may be of substantially the same construction as the "AB" valve device fully described in the patent to Clyde C. Farmer, No. 2,031,213, issued February 18, 1936, and in view of this it is deemed unnecessary to show and describe the device in detail. It will of course be understood that this device operates upon a service reduction in brake pipe pressure to supply fluid under pressure from the auxiliary reservoir to the brake cylinder to effect a service application of the brakes, upon an emergency reduction in brake pipe pressure to supply fluid under pressure from both the auxiliary reservoir and the emergency reservoir to the brake cylinder to effect an emergency application of the brakes and upon an increase in brake pipe pressure to effect a release of the brake and the charging of the brake equipment.

The combined cut off and brake cylinder release valve device 6 may comprise a two piece casing having clamped therebetween in any suitable manner a flexible diaphragm 8. At one side of the diaphragm 8 there is an annular seat rib 10 arranged for sealing engagement by the diaphragm. Within this seat rib 10 is a chamber 11 to which a passage 12 is connected. The passage 12 is connected to the usual brake cylinder connection of the "AB" brake controlling valve device 1 by means of the usual brake cylinder or application and release pipe 13. Encircling the seat rib 10 is a valve chamber 15 which is in constant open communication with the brake cylinder 5 by way of a pipe 16. The lower wall of valve chamber 15 is provided with a passage 17 leading to the atmosphere and surrounding this passage within the chamber 15 is a valve seat 18.

Mounted in valve chamber 15 and engaging the valve seat 18 is a valve 19 having a stem 20 which extends into the passage 17. This stem is provided with a central bore 21 which extends through the valve 19 and which is open at both ends. Slidably mounted in the upper end of bore 21 is a plunger 22 having an extension 23 which extends upwardly into valve chamber 15. The extension 23 is provided with a valve 24 constructed and arranged to engage a valve seat 25 surrounding said bore and projecting upwardly from the back of the valve 19. The extension 23 is further provided with a transversely extending aperture 26 which is adapted to receive one end of a lever 27.

The lever 27 is pivotally mounted intermediate its end on a pin 30 carried by spaced lugs 31 projecting upwardly from the lower wall of chamber 15. The opposite end of the lever 27, as best shown in Fig. 2, is made in the form of a jaw which is operatively connected to the diaphragm 8 at opposite sides of the seat rib by means of members 32 carried in any suitable manner by the diaphragm 8. Interposed between and operatively engaging the lever 27 and the elevated portion of the lower wall of the chamber 15 is a spring 33 which tends, at all times, to urge the diaphragm 8 to the position in which it is shown in the drawing.

Mounted in bore 21 and operatively associated with plunger 22 by means of a spring 34 is a plunger 35. The plunger 35 is provided with a collar 36 for engagement with the lower end of the valve stem 20. Below the collar 36 this plunger 35 engages a rocking element 37. The rocking element 37 is provided with a pair of similar oppositely extending arms 38 and 39 which engage pins 40 and 41, respectively, and which are movable upwardly relative to the pins. The pins 40 and 41 are carried by a pair of brackets 42 and 43, respectively, which extend downwardly from and are preferably formed integral with the casing. The rocking element 37 is also provided with an actuating arm 45 which is connected to operating rods extending to opposite sides of the car from which location they are accessible for operation by a trainman.

At the opposite side of the diaphragm 8 there is a chamber 46 which may be infinitely small and which is in constant open communication with the passage 12 and thereby pipe 13 by means of a passage 47.

Assume the brake equipment shown in Fig. 1 to be fully charged with fluid under pressure, the brake controlling valve device 1 to be in its brake release position and the combined cut off and release valve device 6 to be in its normal position as shown in Fig. 1 of the drawing. Under these conditions the brake cylinder 5 will be connected to the atmosphere, by way of pipe 16, chamber 15 in the combined cut off and release valve device 6, past the seat rib 10, chamber 11, passage 12, pipe 13 and through the brake controlling valve device 1 by way of the usual well known exhaust communication, so that the brakes on the vehicle will be released.

When the pressure of fluid in the brake pipe 4 is reduced at a service rate to effect a service application of the brakes, the brake controlling valve device operates in the usual manner to supply fluid under pressure from the auxiliary reservoir 2 to pipe 13, and when the reduction in brake pipe pressure is made at an emergency rate to effect an emergency application of the brakes said valve device operates to supply fluid under pressure from both the auxiliary reservoir 2 and emergency reservoir 3 to the pipe 13.

In either event fluid under pressure thus supplied to pipe 13 flows therefrom to passage 12 from whence it flows to chambers 46 and 15 at opposite sides of the diaphragm 8. The flow of fluid from passage 12 to chamber 46 is by way of passage 47 and the flow to chamber 15 is by way of chamber 11 and past seat rib 10.

Fluid under pressure supplied to chamber 15 flows by way of pipe 16 to the brake cylinder 5 to effect an application of the brakes.

It will be understood that the pressure of the fluid thus supplied to chambers 15 and 46 and acting on opposite sides of the diaphragm 10 is equal so that the spring 33 acting through the medium of lever 27 maintains the diaphragm 8 biased upwardly in its normal position as shown.

When a subsequent increase in brake pipe pressure is made to effect a release of the brakes following either a service or an emergency application, the brake controlling valve device 1 functions in the usual well-known manner to connect pipe 13 with the atmosphere. With pipe 13 thus connected to the atmosphere the connected chambers 15 and 46 at opposite sides of the diaphragm 8 are also connected to the atmosphere and the spring 33 acting through the medium of lever 27 maintains the diaphragm in its normal position so the fluid under pressure in the brake cylinder 5 is free to flow in the opposite direction to the atmosphere through the brake cylinder exhaust circuit hereinbefore traced.

From the foregoing it will be understood that the brakes may be applied and released in the usual well known manner without any interference by the combined cut off and release valve device 6.

If a car provided with apparatus shown in Fig. 1 is cut out of a train and the brake pipe 4 is vented, the brake controlling valve device 1 will operate to cause an emergency application of the brakes in the same manner as hereinbefore described.

With the brakes on the car thus applied in emergency and the brake pipe 4 vented, let it be assumed that it is desired to release the fluid under pressure from the brake cylinder 5 for releasing the car brakes, without recharging the brake pipe 4 and without losing the stored fluid pressure in the auxiliary and emergency reservoirs 2 and 3, respectively.

According to the present invention, this end may be accomplished by the operation of the valve device 6 which operation is initiated by the trainman either pulling or pushing rod 48. Assuming that the rod 48 is pushed inwardly from the right hand side of the car that is in a direction toward the left hand as viewed in the drawing, the lower or connected end of arm 45 of rocking element 37 will move in the same direction, and as a result the element 37 will rock in a clockwise direction about the pivot pin 41. It will be understood that if the rod 48 is moved inwardly from the opposite side of the car the rocking element 37 will rock in a counterclockwise direction about the pivot pin 40. Irrespective of whether the rocking element is rocked in a clockwise or counterclockwise direction, it will shift the plunger 35 upwardly relative to the valve stem 20.

The plunger 35 as it is thus moved upwardly acts through the medium of spring 34 to cause the plunger 22 to move in the same direction and thereby unseat the valve 24. The valve 24, as it thus moves, rocks the lever 27 in a counterclockwise direction about the pin 30 against the opposing pressure of spring 33. This rocking motion of the lever 27 causes the left hand end of the lever to move downwardly pulling the diaphragm 8 with it until the diaphragm is brought into sealing engagement with the seal rib 10. When this occurs communication between chambers 11 and 15 will be cut off.

Upon movement of the valve 24 out of engagement with the seat rib 25 communication between chamber 15 and the atmosphere will be established by way of a slot 50 provided in the plunger 22, bore 21 in the piston stem 20 and a passage 51 in the valve stem.

It should here be mentioned that the drop in the pressure of fluid in chamber 15 due to flow of fluid from chamber 15 to the atmosphere through the circuit just traced will be negligible for the reason that the slot 50 in the plunger 22 is of relatively small flow area.

At substantially the same time as the diaphragm 8 engages the seat rib 10 the collar 36 on the plunger 35 engages the lower end of the valve stem 20. Now as the plunger 35 continues to be moved upwardly, the valve stem 20 and thereby the valve 19 are moved upwardly as a unit with the plunger. With the diaphragm in sealing engagement with the seat rib 10, the valve 24 will now be stationary but the spring 34 yields to the upward movement of the plunger 35 and permits the valve 19 to move upwardly relative to the valve 24 and its plunger 22. As the plunger 35, valve stem 20 and valve 19 are thus moved upwardly the valve 19 is moved out of engagement with its seat 18 to establish a communication of large flow area between the chamber 15 and the atmosphere by way of passage 17. With this communication established, a reduction in the pressure of fluid in chamber 15 and connected brake cylinder 5 is quickly effected.

From the foregoing it will be understood that movement of the diaphragm 8 into sealing engagement with the seat rib 10 cuts off communication between chambers 11 and 15, and that with this communication closed, the auxiliary and emergency reservoirs and connected chamber 46 is disconnected from the brake cylinder and that by unseating valve 19 said brake cylinder is connected to the atmosphere, thus providing for a release of brakes on the car without losing the stored fluid pressure in said reservoirs.

Upon effecting such a reduction in pressure in chamber 15 it will be apparent that the pressure of fluid in chamber 46 will be greater than that in chamber 15 so that fluid at this higher pressure will maintain said diaphragm in sealing engagement with its seal rib 10. With the diaphragm thus maintained in the position to cut off communication between the reservoirs and the brake cylinder the trainman may release pressure on the rod 48 and proceed to perform other duties.

When the trainman relieves the pressure on rod 48 the spring 34 acts to move the plunger 35 downwardly thus causing the rocking element 37 to return to its normal position as shown in the drawing. As the plunger 35 moves downwardly the collar 36 thereof moves out of engagement with the end of the valve stem 20, so that the valve 19 will move, by the force of gravity, into engagement with its seat 18, therefore, the valve 19, plunger 36 and rocking element 37 will now be in the position in which they are shown in the drawing. It will here be noted that since the diaphragm 8 is maintained seated on the seat rib 10 the lever 27 will act to maintain the valve 24 in its upper position, i. e., out of engagement with its seat 25 so as to permit the final release of fluid under pressure from chamber 15 and connected brake cylinder to the atmosphere. This final release of fluid under pressure from the chamber 15 and connected brake cylinder 5 take place past unseated valve 24, through groove 50 in the valve stem 22, bore 21 in the piston stem 20, aperture 51 in the valve stem and passage 17 in the casing.

When the car is subsequently cut into a train and the brake pipe 4 is charged with fluid under pressure, the operating parts of the brake controlling valve device 1 will return to their release position, in the usual manner. With the brake controlling valve device 1 in release position, the pipe 13, passage 12 in the combined cut off and release valve device 6 and the connected chambers 11 and 46 are, as hereinbefore mentioned, connected to the atmosphere through the usual exhaust communication established by the brake controlling valve device. Upon release of fluid under pressure from said chambers the compressed spring 33 acts to effect clockwise rocking of the lever 27 about the pin 30. The lever as it thus rocks causing the diaphragm 8 to move out of engagement with the seat rib 10 and at the same time causing the valve 24 and plunger 22 to move downwardly to the position in which they are shown, thus the several parts of the combined cut off and release valve device 6 are returned to their normal positions.

*Description Fig. 5*

The combined cut off and release valve device 60 shown in Fig. 5 may be substituted for combined cut-off and release valve device 6 shown in Fig. 1 to accomplish similar results. The device 60 differs from the device 6 in that the valve 19 and associated plungers 35 and 36 and connecting spring 34 shown in Fig. 1 are omitted and a new valve 62 is provided having an extension 63 and a flutted stem 64 with a projection 65 adapted to engage the rocking element 37.

From the foregoing description of the operation of the combined cut-off and release valve device 6 shown in Fig. 1 it will be understood that the device 60 will remain inoperative during the usual operation of the brake equipment.

It will also be understood that when it is desired to effect a release of the brakes without losing the stored fluid pressure in the auxiliary reservoir, the trainman exerts pressure on the rod 48 to effect rocking motion to the rocking element 37. In the present form of the invention this rocking motion of the element 37 is transmitted through the medium of the projection 65 to effect upward movement of the valve 62. Such upward movement moves the valve out of engagement with its seat and at the same time acts through the medium of the lever 27 to move the diaphragm 8 into sealing engagement with the seat rib 10, so that the diaphragm 8 is seated substantially simultaneously with the opening of valve 62.

Unseating of valve 62 will immediately effect a reduction of pressure in chamber 15 and connected brake cylinder 5 past unseated valve 62 and passage 17. The diaphragm 8 will be in sealing engagement with the rib 10 before the wave of reduction created by opening the valve 62 will be effective in chamber 46 at the opposite side of the diaphragm 8 due to the relatively large volumes in chamber 11 and passage 12. For this reason no greater force will be required to move the diaphragm into sealing engagement with the rib 10 than in the other structure and once seated the reducing pressure in chamber 15 will provide a sufficient pressure differential over the diaphragm to maintain it seated and thereby the valve 62 unseated until such time as the brake controlling valve device 1 is again returned to release position when the spring 33 acts to reposition the mechanism in its normal position as shown, all of which will be understood from the description in connection with Fig. 1.

It will now be noted that the usual "AB" reservoir release valve device is shown in Fig. 1 of the drawing and is identified by the reference numeral 60. This device may be operated to deplete the brake cylinder, auxiliary reservoir, and emergency reservoir of fluid under pressure when it is desired. The only time that this is desirable is when the reservoirs or some connection in open communication therewith is to be removed or replaced. Normally the trainman will make use of the valve device 6 to effect the release of the brakes and thereby maintain the reservoirs partially charged. In some instances the valve device 60 may be rendered inoperative or may be removed. If it is removed the passages leading thereto from the auxiliary reservoir and emergency reservoir may be closed by means of plugs.

Having now described my invention, what I claim as new and desire to secure by Letters Patent, is:

1. A brake release valve mechanism for interposition in a fluid conducting communication leading from the brake controlling valve device to the brake cylinder of a fluid pressure brake, comprising a valve having one position in which said communication is open and having a second position in which the communication is closed, means for actuating said valve, said means including a lever mechanism having a normal position for maintaining said valve in its first mentioned position and being movable to another position for actuating said valve to its said second position, means associated with said lever mechanism for opening a passage through which the brake cylinder is connected with the atmosphere upon operation of said first mentioned means to said other position, and manually operative means for actuating said first mentioned means to said other position.

2. A break release valve mechanism for interposition in a fluid conducting communication leading from the brake controlling valve device to the brake cylinder of a fluid pressure brake, comprising a valve having one position in which said communication is open and having a second position in which the communication is closed, a lever mechanism having a normal position for maintaining said valve in its first mentioned position and operative to a second position for actuating said valve to its said second position, a passage connecting the brake cylinder with the atmosphere, means normally closing said passage and operative to open said passage, and manually operative means for actuating said lever mechanism and said means.

3. A brake release valve mechanism for interposition in a fluid conducting communication leading from the brake controlling valve device to the brake cylinder of a fluid pressure brake, comprising a valve having one position in which said communication is open and having a second position in which the communication is closed, a lever mechanism for controlling the operation of said valve, said lever mechanism having a first position in which the valve is positioned in its first mentioned position and a second position in which the valve is positioned in its said second position, a passage connecting the brake cylinder with the atmosphere, means having a normal position for closing said passage and another position for opening said passage, yielding means for normally maintaining said lever mechanism in its first position and said means in its normal position, and manually operative means for actuating said lever mechanism from its first position to its second position and means from its normal position to its other position.

4. A brake release valve mechanism for interposition in a fluid conducting communication leading from the brake controlling valve device to the brake cylinder of a fluid pressure brake, comprising a valve having one position in which said communication is open and having a second position in which the communication is closed, a lever mechanism operative to move said valve from its first mentioned position to said second position, means operative to operate said lever mechanism and to open a passage through which the brake cylinder is connected with the atmosphere, and other means operative manually to operate said means.

5. A brake release valve mechanism for interposition in a fluid conducting communication leading from the brake controlling valve device to the brake cylinder of a fluid pressure brake, comprising a valve having one position in which said communication is open and having a second position in which the communication is closed, another valve having a normally closed position and operative to another position means operative to move said first mentioned valve from its first mentioned position to said second position and to at the same time actuate said other valve to its other position to open a passage from the brake cylinder to the atmosphere, and manually operative means for actuating said means.

6. A brake release valve mechanism for interposition in a fluid conducting communication leading from the brake controlling valve device to the brake cylinder of a fluid pressure brake, comprising a valve having one position in which said communication is open and having a second position in which the communication is closed, said valve being subject to the opposing pressures of fluid in a control chamber and a valve chamber, means comprising a lever and a plunger mechanism operative from a normal position to another position to actuate said valve from its first mentioned position to said second position and to establish a passage through which the valve chamber and the brake cylinder are connected with the atmosphere whereby fluid under pressure may be released from the valve chamber and brake cylinder, the release of fluid under pressure from the valve chamber rendering the pressure of fluid in the control chamber effective for maintaining said valve in said second position, and manually operative means for actuating said means from said normal position to said other position.

7. A brake release valve mechanism for interposition in a fluid conducting communication leading from the brake cintrolling valve device to the brake cylinder of a fluid pressure brake, comprising a valve having one position in which said communication is open and having a second position in which the communication is closed, said valve being subject to the opposing pressure of fluid in a control chamber and a valve chamber, means for controlling the operation of said valve, said means having a first position in which said valve is in its first mentioned position, and a second position in which said valve is in its said second postion, shifting means for shifting said means from said first position to said second position, manually operative means for actuating said shifting means, and means associated with the manually operative means for venting fluid under pressure from said valve chamber to insure the creation of a sufficient fluid pressure differential over said valve to maintain the valve in said second position and to release fluid under pressure from the brake cylinder.

8. A brake release valve mechanism for interposition in a fluid conducting communication leading from the brake controlling valve device to the brake cylinder of a fluid pressure brake, a diaphragm valve having a normal position in which said communication is open and movable to another position in which the communication is closed, means for moving said diaphragm valve from said normal position to said other position, said means including a lever operatively connected at one end to said diaphragm valve and at its opposite end to a plunger mechanism, a valve associated with said plunger mechanism operative to release fluid under pressure from said brake cylinder, and manually operative means for actuating said plunger mechanism and said valve.

9. A brake release valve mechanism for interposition in a fluid conducting communication leading from the brake controlling valve device to the brake cylinder of a fluid pressure brake, a diaphragm valve having a normal position in which said communication is open and movable to another position in which the communication is closed, a valve operative to open a passage through which the brake cylinder may be vented when said diaphragm valve is in its communication closing position, a lever mechanism operative to a first position to move said diaphragm valve from its normal position to its other position and then to a second position to operate said valve, and means operative to actuate said lever mechanism.

10. A brake release valve mechanism for interposition in a fluid conducting communication leading from the brake controlling valve device to the brake cylinder of a fluid pressure brake, a diaphragm valve having a normal position in which said communication is open and movable to another position in which the communication is closed, a valve operative to open a passage through which the brake cylinder may be vented when said diaphragm valve is in its communication closing position, a plunger arrangement operative to first move said diaphragm valve from its normal position to its other position and to then operate said valve, and manually operative means including a rocking element for actuating said plunger arrangement.

11. A brake release valve mechanism for interposition in a fluid conducting communication leading from the brake controlling valve device to the brake cylinder of a fluid pressure brake, comprising a valve having one position in which said communication is open and having a second position in which the communication is closed, a lever operatively connected at one end to said valve and having a normal position in which said valve is in its communication opening position and movable to another position in which said valve is in its communication closing position, spring means for biasing said lever to its normal position, a movable member connected to the opposite end of said lever operative to move said lever from said normal to said other position, means carried by said movable member for opening a passage through which the brake cylinder may be connected with the atmosphere upon operation of the movable member to move said lever, and manually operative means for actuating said movable membed.

RALPH T. WHITNEY.